United States Patent
Singer

(10) Patent No.: US 7,011,265 B2
(45) Date of Patent: Mar. 14, 2006

(54) FORCE LIMITING RETRACTOR WITH MATCHING BELT WEBBING

(75) Inventor: Klaus-Peter Singer, Hamburg (DE)

(73) Assignee: Autoliv Development AB, (SE)

( * ) Notice: Subject to any disclaimer, the term of this patent is extended or adjusted under 35 U.S.C. 154(b) by 0 days.

(21) Appl. No.: 10/433,180

(22) PCT Filed: Nov. 22, 2001

(86) PCT No.: PCT/EP01/13573

§ 371 (c)(1),
(2), (4) Date: May 29, 2003

(87) PCT Pub. No.: WO02/44451

PCT Pub. Date: Jun. 6, 2002

(65) Prior Publication Data

US 2004/0041054 A1    Mar. 4, 2004

(30) Foreign Application Priority Data

Nov. 29, 2000 (DE) .......................... 200 20 251 U

(51) Int. Cl.
*B65H 75/48* (2006.01)

(52) U.S. Cl. .................................... 242/379.1

(58) Field of Classification Search ............. 242/379.1
See application file for complete search history.

(56) References Cited

U.S. PATENT DOCUMENTS

| | | | |
|---|---|---|---|
| 4,500,578 A * | 2/1985 | van de Kamp | 428/36.1 |
| 4,687,253 A * | 8/1987 | Ernst et al. | 297/478 |
| 4,710,423 A | 12/1987 | Imamura | |
| 4,934,030 A * | 6/1990 | Spinosa et al. | 24/194 |
| 5,349,991 A * | 9/1994 | Okawa et al. | 139/391 |
| 5,478,636 A | 12/1995 | Koseki | |
| 5,547,143 A | 8/1996 | Miller, III et al. | |
| 5,769,130 A | 6/1998 | Brielmann | |

* cited by examiner

*Primary Examiner*—Kathy Matecki
*Assistant Examiner*—Sang Kim
(74) *Attorney, Agent, or Firm*—Robert W Becker & Associates; Robert W Becker

(57) ABSTRACT

Safety belt winder with a locking system for the belt shaft as support for the belt webbing wound upon said belt shaft, which reacts to the vehicle or the safety belt. The safety belt winder has an integrated force limiting device for the safety belt force occurring in the belt webbing on locking the safety belt winder. The belt webbing has a breaking strain of less than 20 kN, with less than 35 warp threads per 10 mm, running in the longitudinal direction thereof and the twill-woven weft yarn is in the form of monofilament threads.

3 Claims, 2 Drawing Sheets

FORCE LIMITING RETRACTOR WITH MATCHING BELT WEBBING

BACKGROUND AND SUMMARY OF THE INVENTION

The specification incorporates by reference the disclosure of German priority document 200 20 251.0 filed Nov. 29, 2000 and PCT/EP01/13573 filed Nov. 22, 2001.

Figure 1:
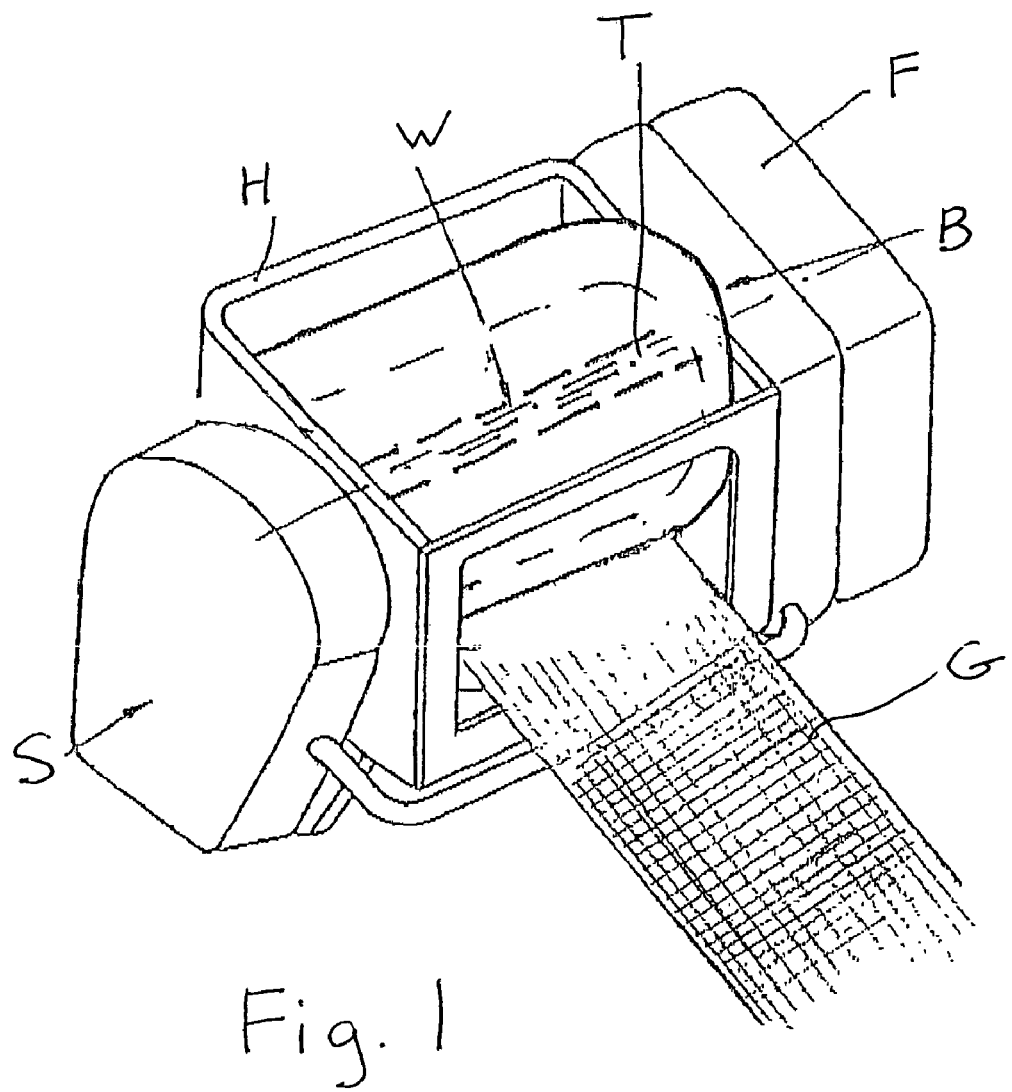
Figure 2:
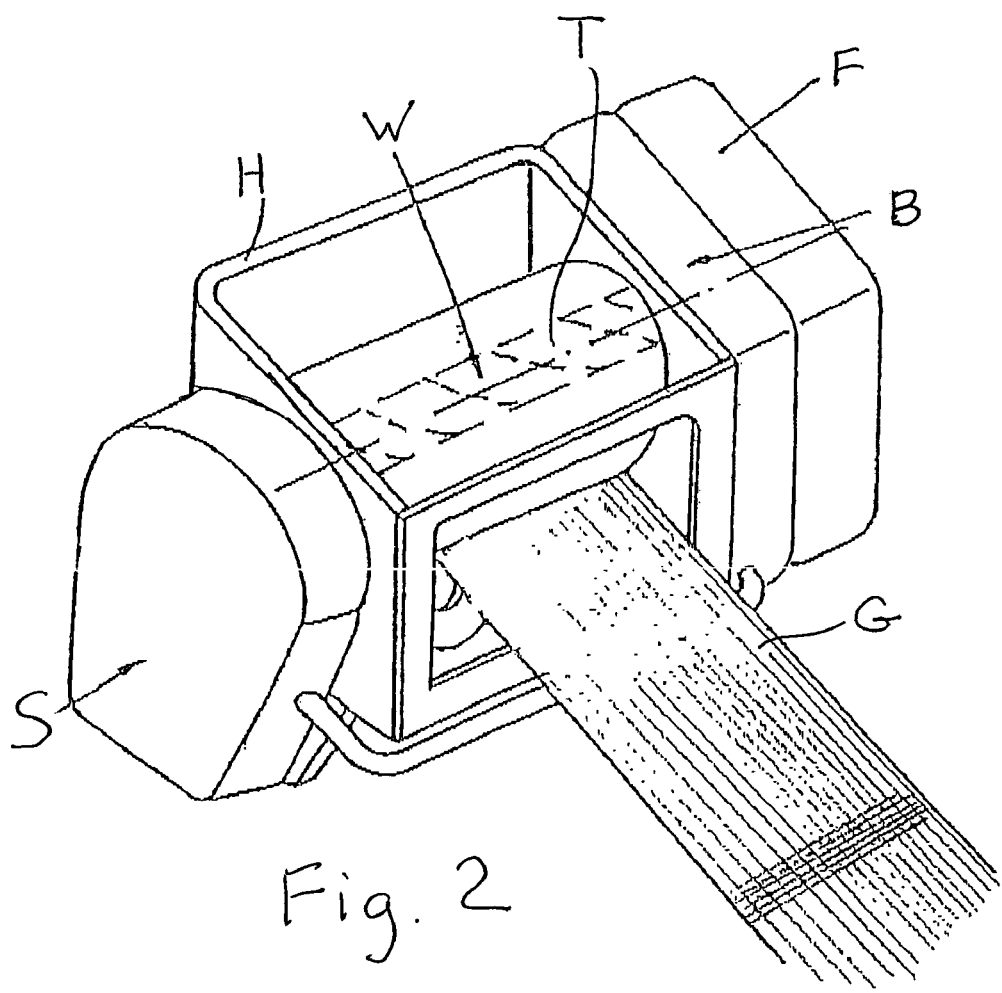

The present invention is, of course, in no way restricted to the specific disclosure of the specification and drawings, but also encompasses any modifications within the scope of the appended claims The invention relates to a safety belt roll-up mechanism composed of belt shaft W and spring system S in or on a housing H and having a blocking system B that is sensitive to or reacts to a vehicle and/or a belt strap G, the blocking system being for the belt shaft W as a support of a belt strap wound onto the belt shaft (see FIGS. 1 and 2 which are provided as a visualization aid, wherein FIG. shows the situation prior to load limitation and FIG. 2 after load limitation). With such belt roll-up mechanisms it is known, for example from WO 96/32303, to integrate a force-limiting device F in order to limit the belt strap forces that occur due to blocking of the safety belt roll-up mechanism that is initiated when dangerous situations occur, and which endanger the strapped-in occupants. The force-limiting device can include a torsion bar T, which is disposed within the belt shaft W. When the belt strap G is wound onto the belt shaft, as in FIG. 1, the torsion bar T is not twisted or deformed. When the belt strap is unwound and the roll-up mechanism is subjected to stress (FIG. 2), with a tensioner activated, the torsion bar T is correspondingly twisted, as indicated by the slanted lines. Up to now, the use of a force limitation within a safety belt roll-up mechanism has not led to an adaptation of the design of the belt strap to the force conditions that have changed due to the use of a force limiting device in the safety belt roll-up mechanism; the invention therefore proposes in detail, with regard to the design of the belt strap, that the belt strap, which has a breaking load of less than 20 kN, has fewer than 35 warp threads per 10 mm of belt strap width, with the warp threads extending in the longitudinal direction of the belt strap, and the twill-woven weft threads are embodied as monofilament threads.

Thus, to the extent that the use of a force limiting device in a safety belt roll-up mechanism enables the belt strap force that occurs in the region of the blocked belt roll-up mechanism to be limited in each buckled or strapped-in position, and in all cases when a load occurs, it is inventively proposed to significantly reduce the breaking load of the belt strap in comparison with conventional belt straps. This reduction of the breaking load makes it possible, pursuant to the invention, to reduce the number of the warp threads, which extend in the longitudinal direction of the belt strap, by about 40% relative to conventional belt straps, to fewer than 35 warp threads per 10 mm of belt strap width. This lower number of warp threads has the advantage that a lower longitudinal stiffness of the belt strap is established relative to the conventional belt strap; furthermore, the weight of the belt strap is reduced due to the reduced material use, and finally there also results a lower belt strap thickness due to the fact that the monofilament weft threads, which, despite the reduced number of warp threads, effect an adequate transverse rigidity, are during the weaving disposed between the warp threads, which extend at a greater spacing relative to one another. All three factors together lead to an improvement of the placement and removal comfort, as well as of the wearing comfort, of the belt strap.

From a technical standpoint, the reduced belt strap thickness leads to a smaller diameter of the belt shaft, so that the installation dimensions of a correspondingly equipped safety belt roll-up mechanism are reduced. At the same time, the feed spool effect, which occurs during loading of the belt strap wound upon the belt shaft, is also lower, and hence an uncontrolled preliminary movement of the strapped-in occupant is reduced.

Finally, the invention also has economical advantages; for example, due to the lower material usage, and the weaving speed, which is possibly increased due to the lower number of warp threads, the manufacturing expense for weaving the belt strap is reduced. In addition, the subsequently necessary finishing of the belt strap fabric by thermo fixing is less expensive, since, for example, a prescribed elongation characteristic no longer has to be set.

DE 31 13 701 suggests a thinner belt strap in order to thereby reduce the volume and weight of the safety belt roll-up mechanism; however, in so doing it is specifically indicated that the strength of the belt strap should be maintained, so that this document provides no suggestion for achieving the inventive teaching. To the extent that this document might address a conceivable reduction of the number of warp threads, this conceivable reduction of the number of warp threads is compensated for by an increase in the number of weft threads.

In a similar manner, DE 41 04 516 A1 addresses the possibility of reducing the number of warp threads, however, this reduction is to be compensated for by the use of weft threads that are finished in such a way that their extensibility against breaking is significantly increased. Since by the use of such specialized weft threads, the service life of the warp threads is to be increased, the strength of the thus-provided belt strap is maintained in comparison with conventional belt straps. In this way, this document also provides no suggestion for achieving the claimed technical teaching.

The use of monofilament weft threads for setting an adequate transverse rigidity of a belt strap is, in principle, known from DE 33 45 508 A1, however without providing a connection to the number of warp threads.

Whereas with conventional belt straps the woven belt strap is subjected to a special finishing, especially by thermo fixing, with the objective of providing the elongation characteristic of the belt strap such that as the loading increases, or after a predetermined loading state, the elongation of the belt strap becomes greater in order to enable a preliminary movement of the strapped-in occupant, it is provided pursuant to one embodiment of the invention that the belt strap have a linear elongation characteristic. In addition to the preliminary movement of the strapped-in occupant, which is established by the force limiting device in the belt roll-up mechanism, this does not lead to an influencing of this preliminary movement effect due to an incalculable elongation of the belt strap. To the extent that the elongation of the woven belt strap can correspond to the elongation of the base material used for producing the warp threads, there thus results a simplification during the finishing of the woven belt strap by thermo fixing.

For this purpose, it is known from DE 38 41 687 A1 to dispose a belt force limiter in a safety belt system beyond the safety belt roll-up mechanism at the buckle-free end of the lap belt portion, whereby the belt strap that is utilized should have a lower elongation than conventional belt straps so that the preliminary movement path, which does not occur in a directed manner due to the elongation that is not foreseeable in the event of load, remains within acceptable limits.

The features of the subject matter disclosed in the present specification, the patent claims, and the abstract can be important not only individually, but also in any combination with one another for realizing the various embodiments of the invention.

What is claimed is:

1. A safety belt roll-up mechanism having a blocking system for a belt shaft as a support for a belt strap wound onto said belt shaft, wherein said blocking system reacts to at least one of a vehicle and said belt strap, wherein said safety belt roll-up mechanism has an integrated force limiting device for a belt force that occurs in said belt strap when said safety belt roll-up mechanism is blocked, wherein said belt strap has a breaking load of less than 20 kN, wherein said belt strap has fewer than 35 warp threads per 10 mm of belt strap width, wherein said warp threads extend in a longitudinal direction of said belt strap, wherein said belt strap has twill-woven weft threads, wherein said weft threads are monofilament threads, and wherein the woven belt strap has a linear elongation characteristic.

2. A safety belt roll-up mechanism according to claim 1, wherein said woven belt strap has an elongation that corresponds to an elongation of a base material utilized for producing said warp threads.

3. A safety belt roll-up mechanism according to claim 2, wherein said base material for producing a belt strap fabric is a polyester.

* * * * *

UNITED STATES PATENT AND TRADEMARK OFFICE
CERTIFICATE OF CORRECTION

PATENT NO. : 7,011,265 B2
DATED : March 14, 2006
INVENTOR(S) : Singer

It is certified that error appears in the above-identified patent and that said Letters Patent is hereby corrected as shown below:

<u>Title page, Item [54] and Column 1, line 3,</u>
Title, should read: -- FORCE LIMITING RETRACTOR WITH BELT STRAP COORDINATED THEREWITH --.

Signed and Sealed this

Sixth Day of June, 2006

JON W. DUDAS
*Director of the United States Patent and Trademark Office*